United States Patent

Remerowski et al.

[11] Patent Number: 5,770,296
[45] Date of Patent: Jun. 23, 1998

[54] ADHESIVE DEVICE

[75] Inventors: David L. Remerowski; Duane C. Shomler; Anthony T. Racca; David J. Lococo, all of Cincinnati, Ohio; Vladimir Pilic, Smithtown, N.Y.

[73] Assignee: Senco Products, Inc., Cincinnati, Ohio

[21] Appl. No.: 689,180

[22] Filed: Aug. 5, 1996

[51] Int. Cl.⁶ .................................................. B32B 3/02
[52] U.S. Cl. ........................... 428/80; 219/633; 219/634; 428/40.1; 428/41.1; 428/42.1; 428/344; 428/345; 428/347; 428/913
[58] Field of Search ................... 428/40.1, 40.9, 428/41.1, 42.1, 344, 345, 347, 354, 913, 200, 80; 219/633, 634

[56] References Cited

U.S. PATENT DOCUMENTS

| | | | |
|---|---|---|---|
| 3,574,031 | 4/1971 | Heller, Jr. et al. | 156/273 |
| 3,612,803 | 10/1971 | Klass | 329/10.53 |
| 3,733,231 | 5/1973 | Rutkowski et al. | 156/71 |
| 3,845,268 | 10/1974 | Sindt | 219/10.77 |
| 3,846,204 | 11/1974 | Eisler | 156/275 |
| 3,996,402 | 12/1976 | Sindt | 428/140 |
| 4,029,837 | 6/1977 | Leatherman | 428/247 |
| 4,038,120 | 7/1977 | Russell | 156/71 |
| 5,500,511 | 3/1996 | Hansen et al. | 219/633 |

FOREIGN PATENT DOCUMENTS 0461979  6/1991  European Pat. Off. .

*Primary Examiner*—Nasser Ahmad
*Attorney, Agent, or Firm*—Jerrold J. Litzinger

[57] ABSTRACT

An adhesive device, featuring a target element, absorptive of electromagnetic waves, contiguous with a heat-activatable adhesive material, shaped into an article having a mathematically smooth perimeter, will facilitate a quick, neat, easy and secure assembly of associated component pieces or manufactured articles. Exposing the device to electromagnetic waves will produce heat energy which will activate the adhesive material and result in the bonding of the associated component pieces. This adhesive device is particularly beneficial when used within or between pieces to be assembled that are substantially transparent to electromagnetic waves.

7 Claims, 2 Drawing Sheets

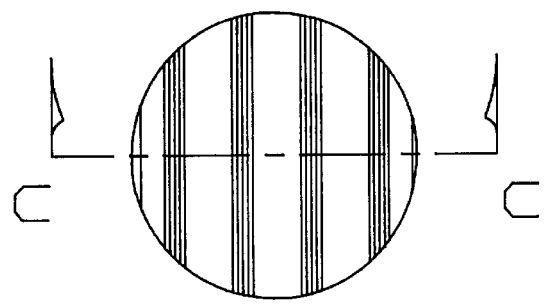
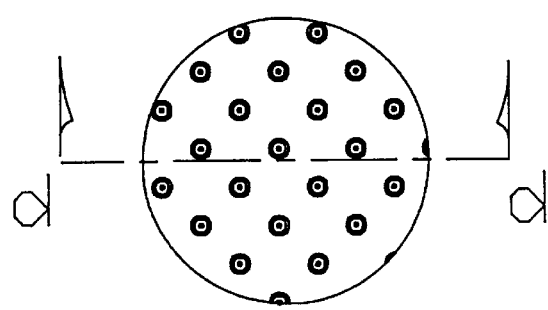
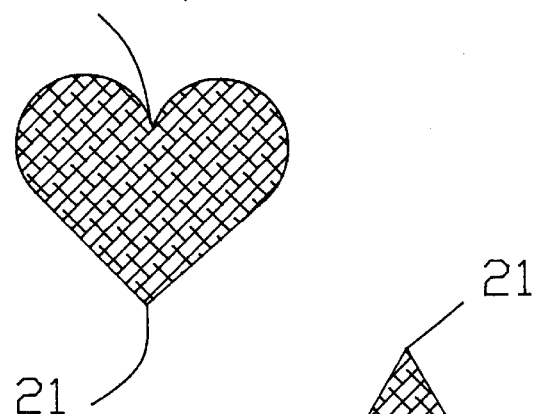
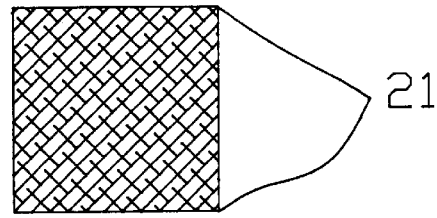
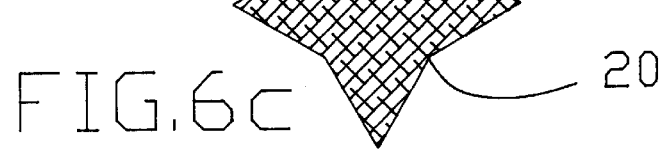

ADHESIVE DEVICE

BACKGROUND OF THE INVENTION

1. Field of The Invention

The disclosed invention relates generally to an adhesive device useful in facilitating the assembly of associated parts or components of a manufactured or constructed product. The device essentially comprises a target element contiguous with a heat-activatable adhesive material and configured into a shape having a mathematical smooth perimeter to obtain a more reliable and secure bonding of the assembled pieces.

2. Description of The Prior Art

U.S. Pat. No. 3,574,031 to Heller et al. describes a method and material for welding thermoplastic bodies by using a susceptor sealant between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets is effected by applying and exposing the susceptor sealant to heat energy, softening the carrier material and joining all thermoplastic materials.

U.S. Pat. No. 3,996,402 to Sindt relates to the assembly of sheet materials by the use of angular fastening devices utilizing an foraminous sheet of eddy current-conducting material sandwiched between coatings of hot-melt glue. An induction heating system is activated causing eddy current heating in the EC-conducting material with consequent melting of the hot-melt glue thus resulting in fusion and, ultimately, bonding of the sheet materials in accordance with the desired construction.

U.S. Pat. No. 5,500,511 to Hansen et al. describes an induction welding technique using a susceptor, which in this instance is a thin, perforated metal foil, embedded in an adhesive, placed between the plies or layers of an assembly. Not surprisingly, Hansen et al., prior to making their invention, experienced difficulty in obtaining uniform heating at the weld sites on their composite materials. According to their '511 patent, they've solved their problem by fashioning the susceptor into a diamond-shaped mesh with double-thick edges. While the solution to the welding problem encountered by Hansen et al. may or may not work to solve problems presented in an adhesive bonding situation, it is important to make note of the fact that subtle and seemingly superficial alterations like size and shape can effect significant improvements in product performance.

SUMMARY OF THE INVENTION

The instantly disclosed adhesive device is distinguished from, and improves upon, the prior art by providing an adhesive device having a target element for absorbing electromagnetic waves, contiguous with a heat-activatable adhesive material and shaped so that the perimeter of the device is mathematically smooth. Such a configuration will avoid a perimeter having discontinuous lines which disadvantageously provide points, and therefore angles, that disrupt the flow of eddy currents in the target element and result in areas of excessive or insufficient heating, relative to the remainder of the perimeter, causing challenges to the integrity of the adhesive bond. Furthermore, heretofore, when using the devices of the prior art, there was always the risk of damaging the associated pieces to be assembled by experiencing intensified heat along angular aspects of the perimeter of the prior art device. With the presently disclosed device, that risk is now greatly diminished.

This disclosure also relates to an improved and expeditious method for assembling and adhering associated component pieces of various materials which, for the most part, are transparent to electromagnetic waves. This improved method of assembly, utilizing the disclosed device, is adaptable to automated and assembly line procedures and in any assembly or manufacturing setting where speed, neatness and ease of manufacture is appreciated.

BRIEF DESCRIPTION OF THE DRAWINGS

Figure 1:
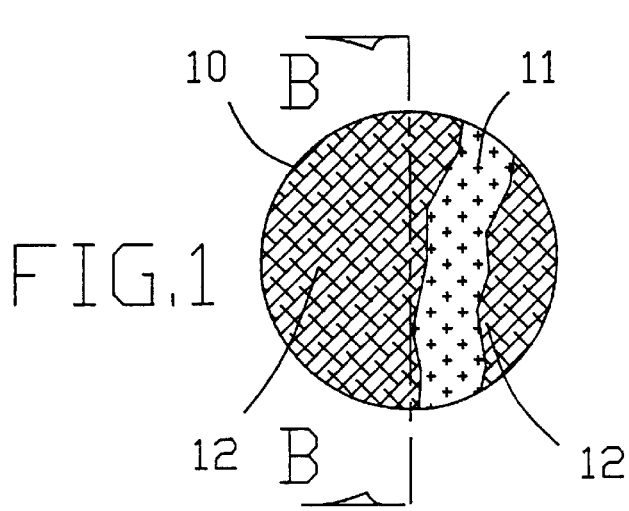

Brief Description of the Drawing:

FIG. 1 is a top view of a circular-shaped adhesive device in partial section.

Figure 2:
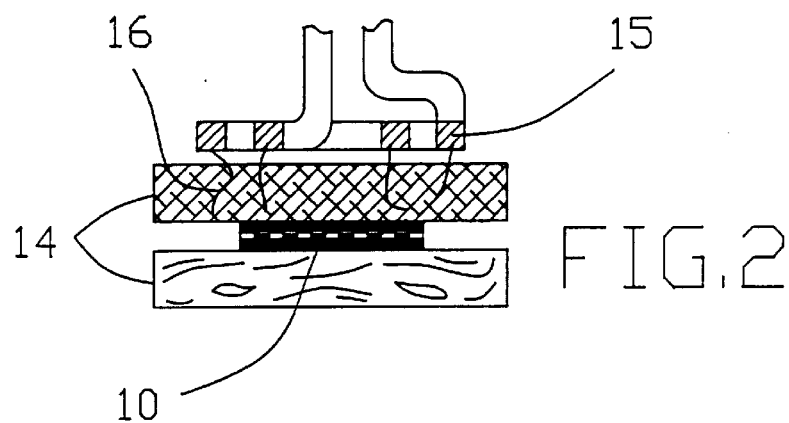
Figure 3:
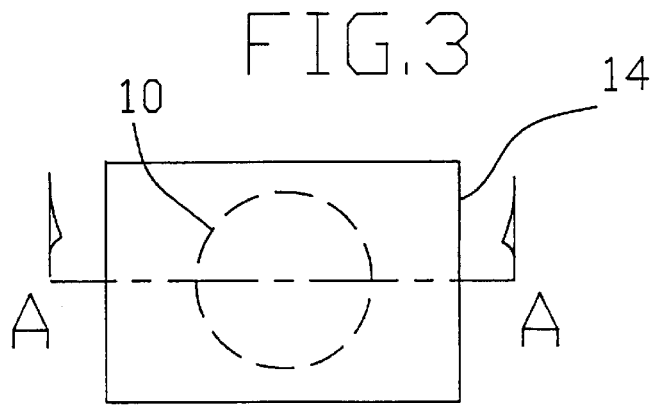

FIG. 2 is a cross sectional view of FIG. 3 along line A—A depicting the device being activated between associated pieces.

FIG. 3 is a top view of the adhesive device "hidden" under or within a material transparent to electromagnetic waves.

Figure 4:
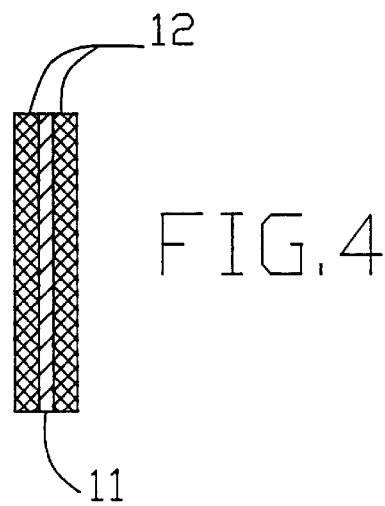

FIG. 4 is a cross section of the adhesive device of FIG. 1 taken along the line B—B.

FIG. 5a is a top view of an adhesive device having a circular perimeter with shading to depict a third dimensional waffling or corrugation effect.

FIG. 5b is a top view of an adhesive device having a circular perimeter and a plurality of internal openings also having mathematically smooth perimeters.

FIG. 5c is a cross section of the adhesive device of FIG. 5a taken along line C—C.

FIG. 5d is a cross section of the adhesive device of FIG. 5b taken along line D—D.

FIGS. 6a, 6b and 6c are top views of comparative depictions of adhesive devices from the prior art demonstrating perimeters with external and internal angles.

DESCRIPTION OF THE PREFERRED EMBODIMENTS

The disclosed adhesive device 10 has been designed to be a fast, safe, neat and economical alternative to traditional fastening devices such as brads, staples, tacks and nails for joining, in a secure relationship, the components of the construction and furniture industries. The disclosed adhesive device is simply, yet essentially, constructed from a target element 11 contiguous with a solid, heat-activatable adhesive material, which material completely coats both sides of target element 11, as can be clearly seen in FIGS. 1 and 4, 12. The target element must, for the most part, be fashioned from materials or substances that are not transparent to electromagnetic waves. Indeed, the target element will necessarily be constructed of a composition that will absorb electromagnetic waves. Once absorbed by the target element, these waves will produce magnetic hysteresis and eddy currents resulting in heat energy which will melt or activate the contiguous adhesive material.

Typically, the target element will be fashioned from metallic materials such as steel, aluminum, copper, nickel or amalgams thereof which have proven utility and are readily available; although, some semi-metallic materials such as carbon and silicon are also known to be suitable for the absorption of electromagnetic waves.

The target element can assume any form or shape consistent with the overall configuration of the adhesive device. Frequently, the target element will be presented as a metallic foil, mesh or strip, but it could just as easily assume the shape of a bead or granule; and, in some instances, it will be more effective to present the target element in the form of a fiber, chip or flake of an electromagnetic absorbable material. The point to be made is that the target element need only be fashioned from a material reasonably impervious to, and absorptive of, electromagnetic waves.

In use, the adhesive device 10 needs to be situated within or between the associated pieces 14 of items to be adhesively joined. Typically, the associated pieces will be wood, plastic, ceramic, fiber board or any of a variety of composite materials. As a practical matter, of course, the associated pieces need to be transparent to electromagnetic waves. Some materials will be more transparent than others, and empirical adjustments can and will be made to modulate the quantity and intensity of electromagnetic wave energy needed to optimally activate the adhesive material 12.

In most instances, it will be sufficient for the adhesive device 10 simply to be placed between the pieces to be assembled. In other construction or assembly situations, it will be necessary to make some arrangements or take additional steps to make sure the adhesive device 10 remains in place prior to activation. Such an additional step need be little more than introducing an additional attachment element such as a small pressure sensitive adhesive area on the surface of the device 10. Simpler means for positioning the device prior to activation might entail tacking, stapling, spiking or even slotting the associated pieces to make sure the adhesive device is situated and activated in the most effective and, therefore, most desirable location. But these measures, of course, would be optional procedures and in no way essential to the performance of the device in its broadest typical and routine applications.

When desirably situated within or between the associated pieces to be joined or assembled, the device 10 is ready to be exposed to electromagnetic waves 16, produced by and emanating from a generator 15 powered by a source of alternating electric current. The generator can be held in a fixed position for assembly-line production or designed to be manipulated so as to quickly and easily pass over, around or near the strategically "hidden" device while emitting electromagnetic waves which will penetrate the "transparent" associated pieces, be absorbed by the target element 11, be converted to heat energy, activate the adhesive material resulting in a bonded relationship between the associated pieces.

To elaborate, somewhat, heat is produced in the conductive target element by two mechanisms: eddy current resistive heating and magnetic hysteresis. Eddy current resistive heating applies to all conductive materials and is produced in the target element by the electromagnetic waves emanating from the generator. The heat resulting from magnetic hysteresis is observed only in magnetic materials. As the electromagnetic field produced by the generator reverses polarity, the magnetized atoms or molecules in the target element also reverse. There is an energy loss in this reversal which is analogous to friction: This energy loss is magnetic hysteresis. The "lost" energy is quickly converted to heat and conducted by the target material to the contiguous, and frequently enveloping, heat-activatable adhesive material to initiate adhesion.

When heated to the necessary temperature, the adhesive material will liquefy or become heat-activated, attach itself to the adjacent associated parts, and, on cooling, create an adhesive relationship between the associated parts.

Two adhesion mechanisms, hot-melt and heat-activated cure, are proposed for use with the disclosed device. Both mechanisms are initiated by heat emanating from the target element. Hot-melt adhesives are solid at ambient temperatures, but melt or liquefy when the temperature is elevated by, for instance, heat accumulating in the target element. The melted adhesive "wets" the adherends and, in the case of porous or fibrous adherends, penetrates the surface of the pieces to be bonded. As the adhesive cools, the adherends and adhesive are bonded by the electrostatic attraction of polar molecular groups. In the case of porous or fibrous adherends, mechanical interlocking can contribute to bond strength. Note that for the hot-melt mechanism, the bonding is reversible. Thus by repeating the induction heating procedure, the bond can be undone and the adherends separated. The ability to reverse the adhesion and separate assembled pieces is not a trivial attribute. In addition to the obvious advantage of being able to reassemble or repair misaligned pieces, it is also desirable to be able to disassemble manufactured articles to facilitate serviceability and repair. And, when working with associated pieces of different materials, it will frequently be beneficial to disassociate assembled pieces to facilitate recycling.

Heat-activated curing adhesives are also solid and easy to manipulate at ambient temperatures, but when the adhesive temperature is elevated by, for example, the heat emanating from the target element, a chemical reaction is initiated. This reaction involves a cure or crosslinked bonding either within the adhesive or between the adherends. Such bonds are typically irreversible. Frequently, a heat-activated curing adhesive bond will demonstrate an electrostatic attraction between the adhesive and the adherends and a crosslinked bond within itself As previously mentioned, the shape or perimeter of the disclosed adhesive device is also important to effect optimal bonding. It has been experimentally determined that the adhesive device must have a mathematically smooth perimeter, which could define either a planar or three dimensional device having height or thickness to more effectively accommodate a particular use. This smooth perimeter could also more commonly be characterized and defined as a simple closed curve without angles. Geometrically, a simple curve does not cross itself, and a closed curve, understandably, is one wherein the ends of the curve are joined. Mathematically, it would be appropriate to define the perimeter of the disclosed device as a continuous line having a continuous derivative. A line with a continuous derivative is one with no discontinuity or angles. Because it is desirable, and necessary if the most secure bond possible is to be obtained, to achieve bonding along the entire length of the perimeter of the device, it is necessary that there be no angular discontinuity in the perimeter. Experimental studies have demonstrated that departures from a mathematically smooth perimeter will result in adhesive weakness and bond failure. For instance, in FIG. 6a a heart-shaped adhesive device is depicted having internal 20 and external 21 angles in the perimeter. Experimentation has shown that the internal angle segment becomes too hot during exposure to electromagnetic radiation and the external angle segment demonstrates less than satisfactory adhesion because the segment appears to be inadequately "heated" by the amount of radiation suitable for the mathematically smooth segments of the device. Consequently, it is an essential and distinguishing feature of the disclosed adhesive device that there be no definable angles in the perimeter.

It is further theorized, and experimentally substantiated, that an angular perimeter will introduce points of stress, and ultimate bond failure, that simply are not seen or experienced in pieces and products assembled with the adhesive device described herein. Furthermore, it is envisioned that the disclosed device might have more than one perimeter. It is conceivable that in certain applications there may be an opportunity to conserve material and/or more aptly meet specific requirements and thereby introduce a hole or holes in the interior of the disclosed device. In these instances it is expected that the requirements defining the external perimeter will also apply to these interior perimeter(s).

Commercial applications of the disclosed adhesive device are legion. Immediate needs for the disclosed device have been identified in the furniture industry where neat, effective and efficient assembly methods can readily be exploited to manufacture affordable units in a fast, effective and clean manner. Furniture and cabinet manufacturing applications will involve, primarily, the assembly of associated pieces of wood and plastic, both of which are transparent to electromagnetic waves and receptive to adhesive bonding. Other construction uses for the disclosed device include the fabrication of lattice panels, the installation of trim molding and fence erection. Also envisioned is the assembly of plywood, gypsum board and combination boards to wall ceiling and floor framing materials. In the packaging industry, there is a need to facilitate the fast and effective construction of containers made of wood, plastic and especially containers made of expensive materials made from engineered fiber base materials, which could all be readily assembled using the disclosed device.

What is claimed is:

1. An adhesive device for the adhesive assembly of associated components which comprises:

a target element having an upper surface and a lower surface, composed of metal foil having a continuous surface which has a mathematically smooth perimeter essentially defining a closed curve, and a heat-activatable adhesive material which completely covers both surfaces of said foil, said target element being absorbent of electromagnetic waves, which are convertible to heat energy to activate said adhesive material.

2. The device according to claim 1, wherein the perimeter essentially defines a circle.

3. The device according to claim 1 wherein the perimeter essentially defines an ellipse.

4. The device according to claim 1 wherein said foil is manufactured from a metallic material taken from a group consisting of aluminum, copper, and steel.

5. The device according to claim 1 wherein said heat-activatable adhesive material is a hot-melt adhesive.

6. The device according to claim 1 wherein said foil is manufactured from a semi-metallic material taken from a group consisting of carbon and silicon.

7. The device according to claim 1, wherein said heat-activatable adhesive material is a heat-activated curing adhesive.

* * * * *